US012471033B2

(12) United States Patent
Khosravirad et al.

(10) Patent No.: US 12,471,033 B2
(45) Date of Patent: Nov. 11, 2025

(54) CONTROL OF RADIO REPEATERS (71) Applicant: Nokia Technologies Oy, Espoo (FI)

(72) Inventors: Saeed Reza Khosravirad, Murray Hill, NJ (US); Harish Viswanathan, Murray Hill, NJ (US); Junqing Guan, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/263,002

(22) PCT Filed: Feb. 2, 2022

(86) PCT No.: PCT/EP2022/052433
§ 371 (c)(1),
(2) Date: Jul. 26, 2023

(87) PCT Pub. No.: WO2022/167465
PCT Pub. Date: Aug. 11, 2022

(65) Prior Publication Data
US 2024/0080776 A1    Mar. 7, 2024

(30) Foreign Application Priority Data

Feb. 4, 2021 (FI) .................................. 20215116

(51) Int. Cl.
*H04W 52/24* (2009.01)
(52) U.S. Cl.
CPC ................ *H04W 52/243* (2013.01)
(58) Field of Classification Search
CPC ... H04W 52/243; H04W 52/42; H04W 52/24; H04W 52/52; H04B 1/525; H04B 7/155;
(Continued)

(56) References Cited

U.S. PATENT DOCUMENTS

| 5,115,514 A | 5/1992 | Leslie |
| 2010/0291865 A1 | 11/2010 | Gore et al. |

(Continued)

FOREIGN PATENT DOCUMENTS

| EP | 3975604 A1 | 3/2022 |
| JP | H08331015 A | 12/1996 |

(Continued)

OTHER PUBLICATIONS

Maier et al., "Long distance and high bandwidth wireless link tests for a 39 GHz to 28 GHz 5G low-cost repeater", IEEE 5G World Forum (5GWF), Jul. 9-11, 2018, pp. 338-342.

(Continued)

*Primary Examiner* — Lana N Le
(74) *Attorney, Agent, or Firm* — Nokia Technologies Oy (57) ABSTRACT An apparatus, and method relating to control of radio repeaters is disclosed. The apparatus may comprise a means for transmitting one or more reference signals at a transmit power level using a transmit antenna of a repeater. The apparatus may also comprise a means for measuring a receive power level of the corresponding one or more reference signals received using a receive antenna of the repeater and determining a self interference power value based on the difference between the transmit power level of the one or more reference signals and the receive power level of the one or more corresponding reference signals. The apparatus may modify a gain associated with an amplifying means of the repeater based on the determined self-interference value.

20 Claims, 6 Drawing Sheets (58) Field of Classification Search
CPC ........ H04B 7/06; H04B 1/1081; H04B 1/126; H04B 7/0857; H04B 1/1027; H04B 1/10; H04B 1/109; H04B 1/1036; H04B 1/123; H04B 1/0475; H04B 15/02; H04B 7/18543; H04B 7/15535; H04B 7/15564; H04B 7/15578; H04B 7/15585; H04B 7/1555; H03H 2/006; H03G 3/20; H03G 3/3052

See application file for complete search history.

(56) References Cited

U.S. PATENT DOCUMENTS

| | | | | |
|---|---|---|---|---|
| 2013/0044621 | A1* | 2/2013 | Jung | H04W 52/42 |
| 2016/0323830 | A1* | 11/2016 | Kim | H04B 1/525 |
| 2018/0205533 | A1 | 7/2018 | Lee et al. | |
| 2019/0222296 | A1 | 7/2019 | Khandani | |
| 2020/0091608 | A1 | 3/2020 | Alpman et al. | |
| 2020/0313779 | A1 | 10/2020 | Kim et al. | |
| 2020/0343964 | A1 | 10/2020 | Ashworth et al. | |
| 2020/0358500 | A1 | 11/2020 | Ryu et al. | |
| 2022/0159580 | A1* | 5/2022 | Su | H04W 52/243 |
| 2022/0232481 | A1* | 7/2022 | Kusashima | H04B 7/15564 |
| 2024/0172137 | A1* | 5/2024 | Han | H04W 52/243 |
| 2025/0184789 | A1* | 6/2025 | Noh | H04B 7/06 |

FOREIGN PATENT DOCUMENTS

| | | |
|---|---|---|
| WO | 2020/222458 A1 | 11/2020 |
| WO | 2020/235326 A1 | 11/2020 |

OTHER PUBLICATIONS

Riihonen et al., "On the feasibility of full-duplex relaying in the presence of loop interference", IEEE 10th Workshop on Signal Processing Advances in Wireless Communications, Jun. 21-24, 2009, pp. 275-279.

Suk et al., "Full duplex integrated access and backhaul for 5G NR: Analyses and prototype measurements", arXiv, Jul. 7, 2020, pp. 1-8.

"Verizon expands 5G Home, completes mmWave repeater trials", RMC Contracting, Retrieved on Sep. 3, 2023, Webpage available at : https://rmgcllc.net/verizon-expands-5g-home-completes-mmwave-repeater-trials/.

"Verizon deploys Movandi 5G mmWave smart active repeater", Embedded.com, Retrieved on Sep. 3, 2023, Webpage available at : https://www.embedded.com/verizon-deploys-movandi-5g-mmwave-smart-active-repeater/.

Heino et al., "Recent Advances in Antenna Design and Interference Cancellation Algorithms for In-Band Full Duplex Relays", IEEE Communications Magazine, vol. 53, No. 5, May 2015, pp. 91-101.

Sim et al., "Nonlinear Self-Interference Cancellation for Full-Duplex Radios: From Link- and System-Level Performance Perspectives", arXiv, Feb. 15, 2017, pp. 1-11.

Office action received for corresponding Finnish Patent Application No. 20215116, dated Jun. 28, 2021, 9 pages.

Office action received for corresponding Finnish Patent Application No. 20215116, dated Dec. 27, 2021, 5 pages.

International Search Report and Written Opinion received for corresponding Patent Cooperation Treaty Application No. PCT/EP2022/052433, dated Jun. 3, 2022, 11 pages.

* cited by examiner

| Tx beam index | Rx beam index | Δ' | Measured self interference power level at amplifying gain G dBm | Dynamic amplifying gain constraint |
|---|---|---|---|---|
| 1 | 1 | 10 db | 0 dB | G + min{10-0; max amplifying gain - G} |
| 1 | 2 | 10 db | 25 dB | G - 15 (Turn off amplification, e.g., if G<45 dBm) |
| 2 | 1 | 10 db | 5 dB | G + min{10-5; max amplifying gain - G} |
| 2 | 2 | 10 db | 11 dB | G - 1 dBm |

CONTROL OF RADIO REPEATERS

FIELD

Example embodiments relate to an apparatus, method and computer program product relating to control of radio repeaters.

BACKGROUND

Radio repeaters provide a way of extending range for radio signals, for example in radio access networks (RAN). The term "relay" may be used in the same context. In its simplest form, a radio repeater is an apparatus that comprises a radio receiver, an amplifier and a radio transmitter. The radio receiver may receive a signal from, for example, a first node of a radio network and may retransmit the signal to another node. Radio repeaters may become important in radio networks where coverage and range is an issue, for example where the underlying radio access technology has a limited range. The Fifth Generation (5G) New Radio (NR) technology is one such example.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: transmitting one or more reference signals at a transmit power level using a transmit antenna of a repeater; measuring a receive power level of the corresponding one or more reference signals received using a receive antenna of the repeater; determining a self-interference power value based on the difference between the transmit power level of the one or more reference signals and the receive power level of the one or more corresponding reference signals; and modifying a gain associated with an amplifying means of the repeater based on the determined self-interference value.

The apparatus may further comprise a means for determining if the self-interference power value is above a predetermined threshold and wherein the modifying means is configured to reduce the gain if the self-interference power value is above the predetermined threshold and to increase the gain if the self-interference power value is below the predetermined threshold.

The predetermined threshold may be based on the transmit power level minus a predetermined design value. The predetermined design value may be user-defined.

The modifying means may be configured to reduce or increase the gain based on the difference between the self-interference power value and the predetermined threshold.

The modifying means may be configured to reduce the gain by an amount substantially equal to the difference between the self-interference power value and the predetermined threshold.

The modifying means may be configured to determine that the amount of gain reduction is greater than a further predetermined threshold and, responsive thereto, to disable at least the amplifying means.

The modifying means may be configured to increase the gain by an amount substantially equal to the minimum of (i) the difference between the self-interference power value and the predetermined threshold and (ii) a maximum gain value associated with the amplifying means minus the current gain.

The apparatus may further comprising means to access one or more sets of reference data indicative of the amount of gain reduction or increase to apply for a given received self-interference power value.

The one or more sets of reference data may comprise a look-up-table pre-populated during characterization testing and prior to deployment of the apparatus.

One or both of the transmit and receive transmit antennas may comprise an antenna array for respectively transmitting and receiving respective reference signals using a plurality of beams, wherein the reference data is indicative of the amount of gain reduction or increase to apply for different combinations of transmit and receive antenna beams, and wherein the modifying means is configured to modify, at a given time, the gain for a given beam combination based on the reference data.

The reference data may be stored remotely from the apparatus, the apparatus being configured to access the reference data over a data network.

The one or more reference signals may be transmitted based on one or more control signals received from a remote node.

The one or more reference signals may be transmitted at one or more times when data-carrying radio signals received by the apparatus are not being retransmitted.

The one or more reference signals may comprise pilot or synchronisation signals (e.g. primary and/or secondary synchronisation signals) associated with the data-carrying radio signals. The timings of these types of reference signals may be provided to the apparatus by a base station or may be pre-provided at the apparatus, e.g. stored on one or more memories.

The apparatus may be configured to retransmit data-carrying radio signals associated with an uplink during a first repeating period and data-carrying radio signals associated with a downlink during a second repeating period, the first and second repeating periods being separated by a guard period, wherein the one or more reference signals are transmitted in the guard period.

The one or more reference signals may be transmitted according to a schedule which determines to transmit the one or more control signals at a time when one or more repeater nodes within a predetermined range of the apparatus do not transmit signals.

The one or more reference signals may be transmitted using a frequency band that is different from frequency band(s) used by one or more repeater nodes within a predetermined range of the apparatus.

The one or more repeater nodes within a predetermined range of the apparatus may comprise one or more repeater nodes associated with a radio access network cell with which the apparatus is associated.

The one or more reference signals may comprise an analogue tone. The analogue tone may be transmitted using a different frequency from frequencies used by one or more repeater nodes within a predetermined range of the apparatus.

The one or more reference signals may comprise a digitally-encoded signal. The digitally-encoded signal may be different from those used by one or more repeater nodes within a predetermined range of the apparatus.

The apparatus may comprise a radio access network (RAN) repeater. The RAN repeater may be configured for full-duplex operation. The RAN repeater may be configured for in-band operation.

According to a second aspect, there is described a method comprising: transmitting one or more reference signals at a transmit power level using a transmit antenna of a repeater; measuring a receive power level of the corresponding one or more reference signals received using a receive antenna of the repeater; determining a self-interference power value based on the difference between the transmit power level of the one or more reference signals and the receive power level of the one or more corresponding reference signals; and modifying a gain associated with an amplifying means of the repeater based on the determined self-interference value.

The method may further comprise determining if the self-interference power value is above a predetermined threshold and wherein modifying may comprise reducing the gain if the self-interference power value is above the predetermined threshold and to increase the gain if the self-interference power value is below the predetermined threshold.

The predetermined threshold may be based on the transmit power level minus a predetermined design value. The predetermined design value may be user-defined.

The modifying may reduce or increase the gain based on the difference between the self-interference power value and the predetermined threshold.

The modifying may reduce the gain by an amount substantially equal to the difference between the self-interference power value and the predetermined threshold.

The modifying may determine that the amount of gain reduction is greater than a further predetermined threshold and, responsive thereto, to disable at least the amplifying means.

The modifying may increase the gain by an amount substantially equal to the minimum of (i) the difference between the self-interference power value and the predetermined threshold and (ii) a maximum gain value associated with the amplifying means minus the current gain.

The method may comprise accessing one or more sets of reference data indicative of the amount of gain reduction or increase to apply for a given received self-interference power value.

The one or more sets of reference data may comprise a look-up-table pre-populated during characterization testing and prior to deployment of the repeater.

One or both of the transmit and receive transmit antennas may comprise an antenna array for respectively transmitting and receiving respective reference signals using a plurality of beams, wherein the reference data is indicative of the amount of gain reduction or increase to apply for different combinations of transmit and receive antenna beams, and wherein the modifying may modify, at a given time, the gain for a given beam combination based on the reference data.

The reference data may be stored remotely from the repeater, the apparatus being configured to access the reference data over a data network.

The one or more reference signals may be transmitted based on one or more control signals received from a remote node.

The one or more reference signals may be transmitted at one or more times when data-carrying radio signals received by the repeater are not being retransmitted.

The one or more reference signals may comprise pilot or synchronisation signals (e.g. primary and/or secondary synchronisation signals) associated with the data-carrying radio signals. The timings of these types of reference signals may be provided to the repeater by a base station or may be pre-provided at the repeater e.g. stored on one or more memories.

The method may further comprise retransmitting data-carrying radio signals associated with an uplink during a first repeating period and data-carrying radio signals associated with a downlink during a second repeating period, the first and second repeating periods being separated by a guard period, wherein the one or more reference signals are transmitted in the guard period.

The one or more reference signals may be transmitted according to a schedule which determines to transmit the one or more control signals at a time when one or more repeater nodes within a predetermined range of the repeater do not transmit signals.

The one or more reference signals may be transmitted using a frequency band that is different from frequency band(s) used by one or more repeater nodes within a predetermined range of the repeater.

The one or more repeater nodes within a predetermined range of the repeater may comprise one or more repeater nodes associated with a radio access network cell with which the repeater is associated.

The one or more reference signals may comprise an analogue tone. The analogue tone may be transmitted using a different frequency from frequencies used by one or more repeater nodes within a predetermined range of the repeater.

The one or more reference signals may comprise a digitally-encoded signal. The digitally-encoded signal may be different from those used by one or more repeater nodes within a predetermined range of the repeater.

The repeater may comprise a radio access network (RAN) repeater. The RAN repeater may be configured for full-duplex operation. The RAN repeater may be configured for in-band operation.

According to a third aspect, there is provided a computer program product comprising a set of instructions which, when executed on an apparatus, is configured to cause the apparatus to carry out the method of: transmitting one or more reference signals at a transmit power level using a transmit antenna of a repeater; measuring a receive power level of the corresponding one or more reference signals received using a receive antenna of the repeater; determining a self-interference power value based on the difference between the transmit power level of the one or more reference signals and the receive power level of the one or more corresponding reference signals; and modifying a gain associated with an amplifying means of the repeater based on the determined self-interference value.

According to a fourth aspect, there is provided a non-transitory computer readable medium comprising program instructions stored thereon for performing a method, comprising: transmitting one or more reference signals at a transmit power level using a transmit antenna of a repeater; measuring a receive power level of the corresponding one or more reference signals received using a receive antenna of the repeater; determining a self-interference power value based on the difference between the transmit power level of the one or more reference signals and the receive power level of the one or more corresponding reference signals; and modifying a gain associated with an amplifying means of the repeater based on the determined self-interference value.

According to a fifth aspect, there is provided an apparatus comprising: at least one processor; and at least one memory including computer program code which, when executed by the at least one processor, causes the apparatus to: transmit one or more reference signals at a transmit power level using a transmit antenna of a repeater; measure a receive power level of the corresponding one or more reference signals received using a receive antenna of the repeater; determine a self-interference power value based on the difference between the transmit power level of the one or more reference signals and the receive power level of the one or more corresponding reference signals; and modify a gain associated with an amplifying means of the repeater based on the determined self-interference value.

BRIEF DESCRIPTION OF DRAWINGS

Example embodiments will now be described by way of non-limiting example, with reference to the accompanying drawings, in which.

DETAILED DESCRIPTION

Example embodiments relate to control of radio repeaters. Radio repeaters may provide a way of extending coverage and range for radio technologies, for example in radio access networks (RANs) such as mobile networks. For the purposes of this disclosure, the term "relay" may be used in the same context.

In its simplest form, a radio repeater is an apparatus that comprises a radio receiver with an associated receive antenna and a radio transmitter with an associated transmit antenna, and an amplifier provided in the signal path between the radio receiver and radio transmitter.

Modern and future radio standards, such as the Fifth Generation (5G) New Radio (NR) standard for mobile networks, may involve the use of radio repeaters given that the range of associated base stations (i.e. gNodeBs or gNBs) for millimetre-wave transmission and reception is relatively low. This may necessitate network densification with a shorter distance between base stations. Integrated Access and Backhaul (IAB) is a feature associated with 5G NR whereby, rather than relying on fibre connections to provide the backhaul connection, part of the wireless spectrum is used for backhaul links as well for radio access links.

Radio repeaters may be more efficient when operating in an "in-band" mode, which is when fronthaul and access links use the same frequency band. Radio repeaters may also be more efficient when operating in a "full-duplex" mode, which is when fronthaul and access transmissions are active at the same time, as opposed to half-duplex repeaters.

In the context of 5G NR, and future standards, the use of antenna arrays for beamforming is proposed. Accordingly, radio repeaters may need to be configured for repeating beamformed signals and for operation in, for example, in-band and/or full-duplex modes for achieving above-mentioned efficiencies. Such solutions may have low cost and low latency attributes while providing higher throughput.

A consideration with radio repeaters is self-interference, which depends on the isolation between the transmit and receive antennas. If isolation is low, this can cause near-field coupling between the transmit and receive antennas. Also, reflections from the surrounding environment may lead to interference from so-called far-field coupling.

Example embodiments relate to control of radio repeaters for mitigating self-interference.

Figure 1:
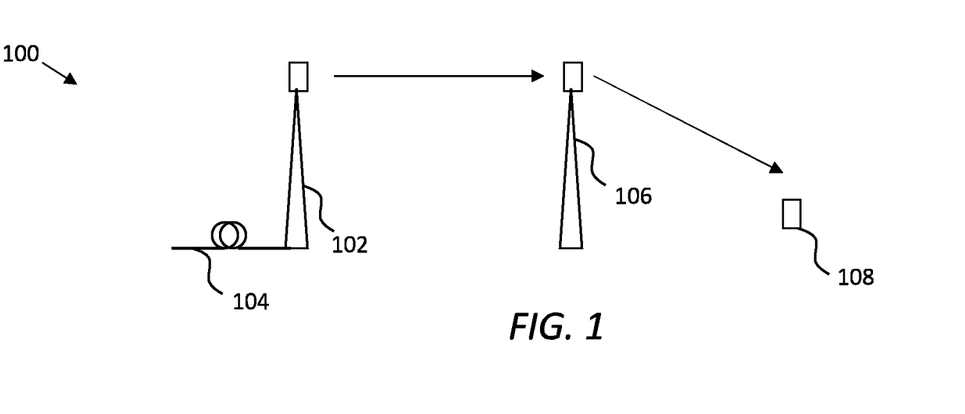
FIG. 1 is a schematic view of a radio repeater as part of a radio access network.

FIG. 1 is a schematic view of a radio repeater 106 as part of a radio access network (RAN) such as a mobile communications network.

FIG. 1 shows a first base station 102, such as a gNb, which may be connected to another part of a RAN, e.g. a core node or distribute unit (DU) via an optical channel 104 or other form of channel. The first base station 102 may have limited transceiving range and hence the radio repeater 106 may be placed within said transceiving range for receiving and re-transmitting radio signals, for example to a user equipment (UE) 108 or other receiving node in range of the radio repeater 106. Similarly, radio signals transmitted by the UE 108 destined for the first base station 102 may be received and re-transmitted by the radio repeater 106 in the other direction.

Figure 2:
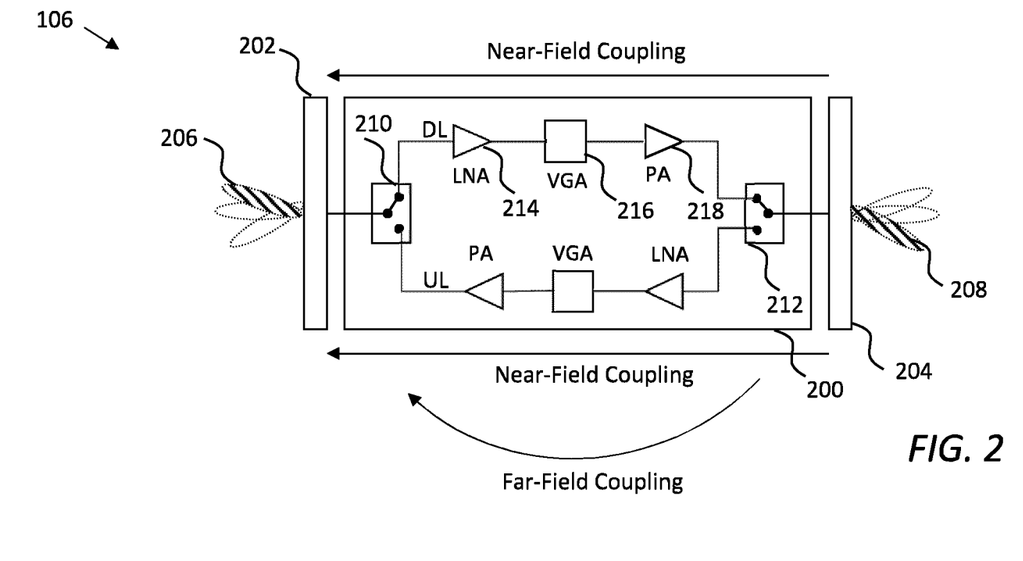
FIG. 2 is a schematic functional view of a radio repeater.

FIG. 2 is a schematic view of at least some functional components of the radio repeater 106 which may be useful for understanding example embodiments.

The radio repeater 106 may comprise circuitry 200, a first antenna 202 and a second antenna 204. At least one of the first and second antennas 202, 204 may comprise an antenna array comprised of multiple antenna elements (e.g. in a grid pattern) from which receive and transmit beams, indicated generally by reference numerals 206, 208, may be formed. It will be appreciated that 5G NR and some future telecommunications standards may employ beamforming in which one or more of such antenna elements may be energised or enabled for receiving and/or transmitting signals by means of directive beams.

FIG. 2 indicates, as part of the circuitry 200, distinct chains of components respectively associated with downlink (DL) and uplink (UL) data-carrying signals. First and second switches 210, 212 may switch between the downlink and uplink chains according to time division duplex (TDD) signalling. The connection of the first and second switches 210, 212 shows a downlink setup and, for or ease of explanation, only the downlink chain of components will be mentioned. According to the downlink setup, the first antenna 202 will act as a receive antenna and the second antenna 204 will acts as a transmit antenna. The reverse will be true for the uplink setup with the lower chain of components considered.

The downlink chain of components may comprise a low noise amplifier (LNA) 214, a variable gain amplifier (VGA) 216 and a power amplifier (PA) 218. A data-carrying signal received by the first antenna 202 will be routed via the first switch 210 to the LNA 214 which may be configured to amplify the data-carrying signal above the noise floor. The data-carrying signal may then be routed to the VGA 216 which amplifies the signal further according to a determined gain setting and may ultimately determine the transmitting range of the radio repeater 106. The PA 218 provides a further, set level of amplification before the amplified data-carrying signal is retransmitted by the second antenna 204.

As mentioned above, the received and retransmitted data-carrying signal may be received in a first beam 206 having a particular receive beam index, and re-transmitted in a second beam 208 having a particular transmit beam index.

Self-interference is indicated schematically in terms of near-field coupling (which may pass through both the downlink and uplink component chains) and also far-field coupling between, in the shown case, the second antenna 204 acting as a transmit antenna and the first antenna 202 acting as a receive antenna.

Example embodiments may involve controlling the gain, for example associated with the VGA 216, in order to mitigate self-interference, as will be explained below.

Figure 3:
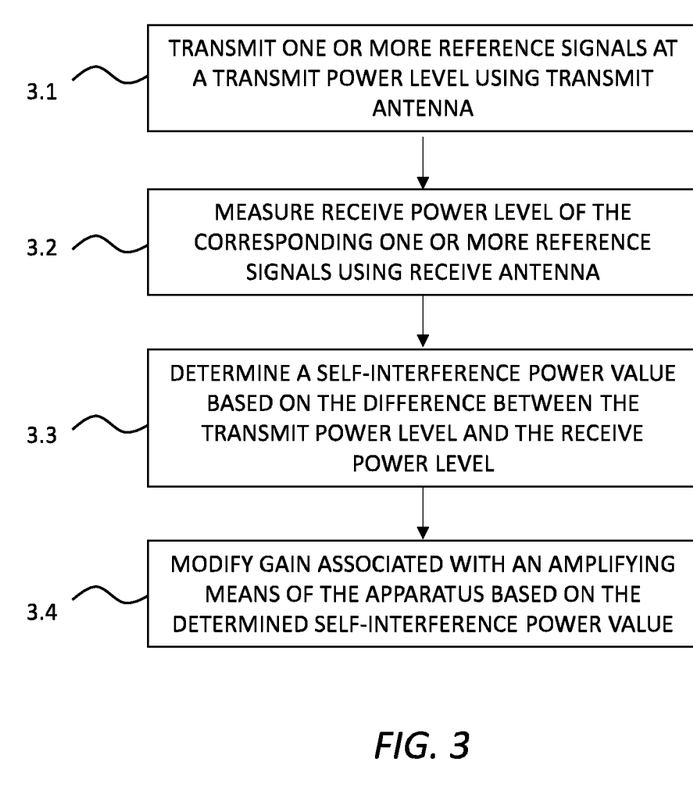
FIG. 3 is a flow diagram indicating processing operations according to some example embodiments.

FIG. 3 is a flow diagram indicating operations that may be performed at a radio repeater according to an example embodiment. The operations may be processing operations performed by hardware, software, firmware or a combination thereof.

Returning to FIG. 3, a first operation 3.1 may comprise transmitting (or causing to transmit) one or more reference signals at a transmit power level using a transmit antenna of a repeater.

A second operation 3.2 may comprise measuring a receive power level of the corresponding one or more reference signals received using a receive antenna of the repeater.

A third operation 3.3 may comprise determining a self-interference power value based on the difference between the transmit power level of the one or more reference signals and the receive power level of the one or more corresponding reference signals.

A fourth operation 3.4 may comprise modifying a gain associated with an amplifying means of the repeater based on the determined self-interference power value.

Further details of the function and form of the one or more reference signals be explained below.

The one or more reference signals may be referred to hereafter as Self Interference Reference Signals, or SIRS.

The self-interference power value may be the SIRS transmit power level minus the SIRS receive power level for the corresponding SIRS.

Example embodiments may involve reducing the gain associated with the amplifying means of the repeater, e.g. the VGA, if the self-interference power value is above a certain threshold value and/or increasing the gain if the self-interference power value is below a certain threshold value.

Figure 4:
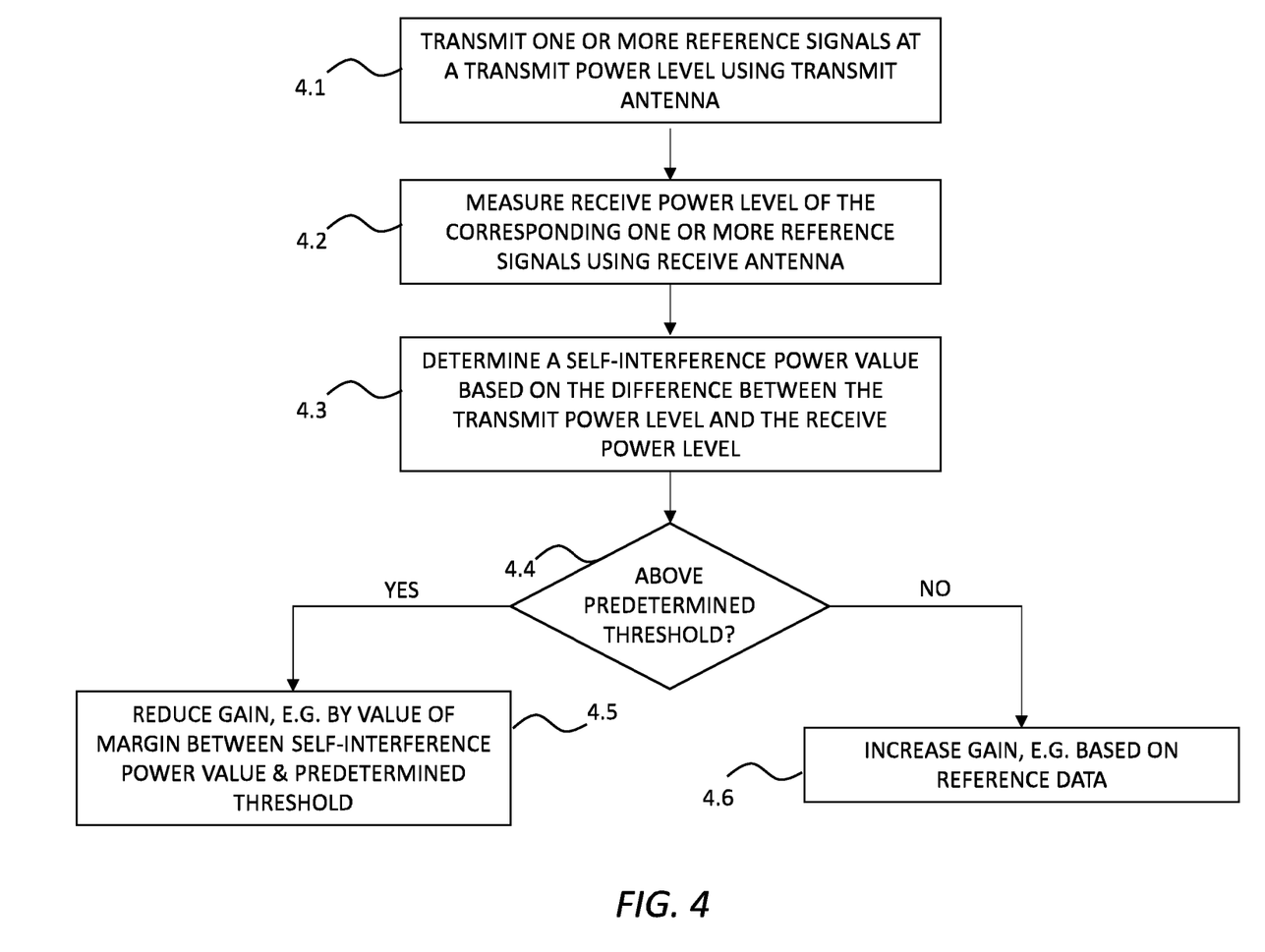
FIG. 4 is a flow diagram indicating other processing operations according to some example embodiments.

For example, FIG. 4 is a more detailed flow diagram indicating operations that may be performed at a radio repeater according to one or more example embodiments. As above, the operations may be processing operations performed by hardware, software, firmware or a combination thereof.

The operations will be explained later on with reference to FIG. 5 which is a schematic diagram of a modified radio repeater 500.

A first operation 4.1 may comprise transmitting (or causing to transmit) one or more reference signals at a transmit power level using a transmit antenna of a repeater.

A second operation 4.2 may comprise measuring a receive power level of the corresponding one or more reference signals received using a receive antenna of the repeater.

A third operation 4.3 may comprise determining a self-interference power value based on the difference between the transmit power level of the one or more reference signals and the receive power level of the one or more corresponding reference signals.

A fourth operation 4.4 may comprise determining if the self-interference power level is above a predetermined threshold.

If yes, in a fifth operation 4.5, the gain of the amplifying means may be reduced, e.g. by an amount substantially equal to the difference between the self-interference power value and the predetermined threshold.

If no, in a sixth operation 4.6, the gain of the amplifying means may be increased.

The predetermined threshold may be referred to as $\Delta'$.

Modifying may comprise reducing the gain if the self-interference power value is above the predetermined threshold $\Delta'$ and increasing the gain if the self-interference power value is below the predetermined threshold. If the self-interference power value is equal or substantially equal to the predetermined threshold, the gain may be maintained at its current level.

The predetermined threshold $\Delta'$ may, for example, be based on the SIRS transmit power level of the one or more SIRSs minus a predetermined design value $\Delta$.

The predetermined design value $\Delta$ may be user-defined and/or modifiable.

For example, with reference to FIG. 2, it may be assumed that isolation between the transmit antenna 204 and the receive antenna 202 (the effective path loss for self-interference) in the shown downlink case should be larger than the overall gain of the downlink components of the radio repeater 106. For example:

$$\text{isolation between } Tx \text{ and } Rx \text{ antenna} \geq \text{total repeater gain} + \Delta \quad (1)$$

The value of $\Delta$ may be set and, if needed, adjusted to reflect a desirable gap between the isolation and the total repeater gain. For example, the value of $\Delta$ for traffic types that are data rate heavy, but are more tolerant to interference, might be in the order of a 3-5 dBs, whereas for reliable data transmissions with very low tolerance to interference, a larger value of $\Delta$ may be used e.g. a 10 dB gap.

The above formula (1) can be written as:

$$\text{isolation between } Tx \text{ and } Rx \text{ antenna } Rx \text{ antenna-} \geq \text{gain+repeater amplifying gain+} Tx \text{ antenna gain} + \Delta \quad (2)$$

If (2) does not hold, the radio repeater 106 may create a strong loop interference, causing a severe degradation to the received Signal to Interference Noise Ratio (SINR) which may defeat the purpose of a radio repeater 106. Indeed, it may be preferable to turn the radio repeater 106 off, or fall back to an out-of-band repeating option to avoid self-interference. In some embodiments, the right-hand-side of the above inequality in (2) may be modified by, for example, adjusting the gain of the VGA 216, to ensure a consistent $\Delta$ gap for the above reasons.

Therefore, the formula (2) may be modified to perform the following comparison.

$$\text{isolation between } Tx \text{ and } Rx \text{ antenna-} Rx \text{ antenna gain-repeater amplifying gain-} Tx \text{ antenna gain} \geq \Delta \quad (3)$$

which can be simplified to:

$$\text{SIRS transmit power level-self interference power value} \geq \Delta \quad (4)$$

The self-interference power value (or level) may be the SIRS transmit power level minus the SIRS receive power level for the corresponding SIRS.

In practical applications, the value of the SIRS transmit power level may be fixed which leaves the comparison as:

self interference power level<Δ'  (5)

where Δ' is the predetermined threshold mentioned above, and may indicate the SIRS transmit power level minus the predetermined design value Δ.

Other methods of setting and adjusting the value of the predetermined threshold Δ' may be used, and the above is one example.

Where one or both of the first and second antennas 202, 204 comprise an antenna array from which receive and transmit beams may be formed, the self-interference power level may depend on the given receive and transmit beam combination. The value of Δ or Δ' can be fixed or can be made beam-specific, although the former option is used in this case.

In such cases, the formula (5) may be re-written as:

self interference power value(Tx beam index #i,Rx beam index #j)<Δ'  (6)

In view of the above, modifying the gain of the amplifier, e.g. the VGA 216 may comprise reducing or increasing the gain based on the difference between the self-interference power value and the predetermined threshold Δ' and/or based on one or more rules or constraints. For example, the gain may be reduced by an amount substantially equal to the difference between the self-interference power value and the predetermined threshold Δ'. In some cases, if the amount of gain reduction is greater than a further predetermined threshold, at least the amplifying means may be disabled so that the radio repeater 106 will not be used.

In some example embodiments, modifying the gain may comprise increasing the gain by an amount based on one or more rules or constraints. For example, the gain may be increased by an amount substantially equal to, for example, the minimum of (i) the difference between the self-interference power value and the predetermined threshold and (ii) a maximum gain value associated with the amplifying means minus the current gain.

Figure 5:
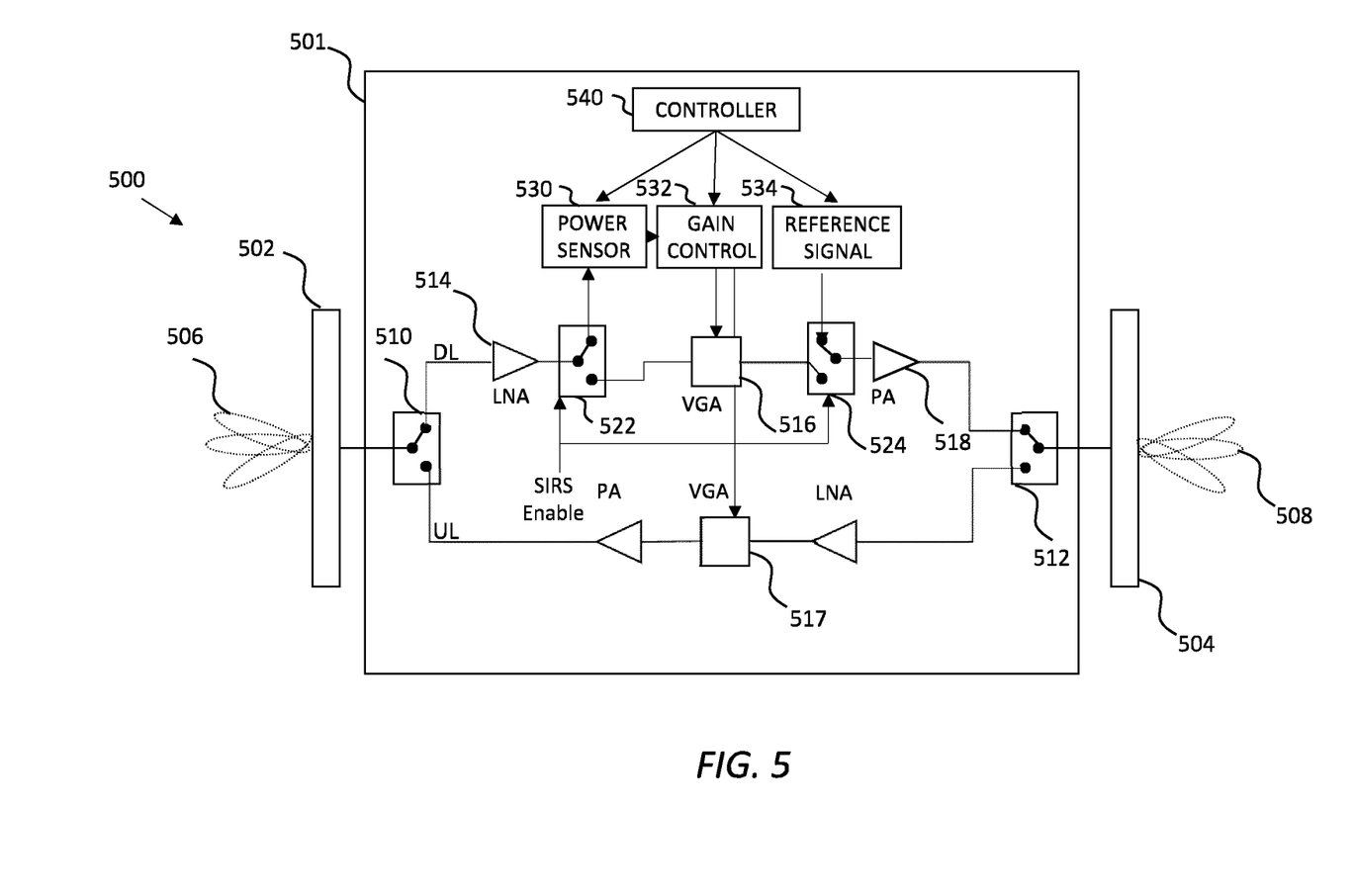
FIG. 5 is a schematic functional view of a radio repeater according to some example embodiments.

FIG. 5 is a schematic view of at least some functional components of a radio repeater 500 according to one or more example embodiments.

The radio repeater 500 may be configured to operate according to the above operations indicated in FIGS. 3 and 4 and according to any related operations discussed herein.

The radio repeater 500 may comprise circuitry 501, a first antenna 502 and a second antenna 504. At least one of the first and second antennas 502, 504 may comprise an antenna array comprised of multiple antenna elements (e.g. in a grid pattern) from which receive and transmit beams, indicated generally by reference numerals 506, 508, may be formed. It will be appreciated that 5G NR and some future telecommunications standards may employ beamforming in which one or more of such antenna elements may be energised or enabled for receiving and transmitting signals by means of directive beams.

FIG. 5 indicates, as part of the circuitry 500, distinct chains of components respectively associated with repeating downlink (DL) and uplink (UL) data carrying signals. First and second switches 510, 512 switch between the downlink and uplink chains according to time division duplex (TDD) signalling. The connection of the first and second switches 510, 512 shows a downlink setup and, for ease of explanation, only the downlink chain of components will be mentioned. According to the downlink setup, the first antenna 502 will act as a receive antenna and the second antenna 504 will acts as a transmit antenna. The reverse will be true for the uplink setup.

The upper, downlink chain of components may comprise a low noise amplifier (LNA) 514, a first SIRS switch 522, a variable gain amplifier (VGA) 516, a second SIRS switch 524 and a power amplifier (PA) 518.

The circuitry 500 may further comprise a power sensor 530, a gain controller 532, a reference signal generator 534 and a controller 540. The controller 540 may be connected to each of the power sensor 530, gain controller 532 and reference signal generator 534 and may be configured to control operation thereof. The controller 540 may also issue an SIRS enable signal to the first and second SIRS switches 522, 524 for setting said switches in the manners indicated below. The controller 540 may form part of the circuitry 501 or may be remote from the radio repeater 500, e.g. operated at some other part of a RAN.

A data-carrying signal received by the first antenna 502 (i.e. for being retransmitted) will be routed via the first switch 510 to the LNA 514 which may be configured to amplify the data-carrying signal above the noise floor. The data-carrying signal may then be routed either to the VGA 516, if the first SIRS switch 522 is disabled, or to the power sensor 530, if the first SIRS switch is enabled in accordance with an SIRS enable signal from the controller 540.

The output from the VGA 516 is routed to the second SIRS switch 524. If the second SIRS switch 524 is disabled by the controller 540, the output from the VGA 516 is therefore routed to the PA 518. If the second SIRS enable switch 524 is enabled by the controller 540, as in the shown case, the output of the reference signal generator 534 is routed to the PA 518 instead.

The gain of the VGA 216 may be set by the gain controller 532 and determines the gain applied to the data-carrying signal when re-transmitted by the transmit antenna 504 if the first and second SIRS switches 522, 524 are disabled.

Regarding the uplink (lower) chain of components, another VGA 517 may also be controlled by the gain controller 532 in the same manner described herein, in the situation where the first antenna 502 is the transmit antenna and the second antenna 504 is the receive antenna. The controller 540 may be configured to cause the reference signal generator 534 to generate one or more reference signals, or SIRSs at one or more times.

In other embodiments, the reference signal generator 543 may generate the one or more SIRSs responsive to one or more control signals from a remote node, e.g. a node in a core part of the RAN.

The SIRSs are transmitted at a known power level, which may be fixed or which may vary. This is referred to above as the SIRS transmit power level.

The times at which the SIRSs are generated is synchronised with the first and second SIRS switches 522, 524 being enabled to the shown state. The SIRSs are therefore transmitted from the radio repeater 500 via the transmit antenna 504. The power sensor 530 then may sense, or measure, SIRS receive power levels received via the receive antenna 502 corresponding to the SIRS transmit power levels for determining a self-interference power level.

The power sensor 530 may then provide the determined self-interference power level to the controller 540 or the gain controller 532 which may determine whether to modify the gain of the VGA 516 in accordance with operations described herein.

If the gain of the VGA 516 (or the VGA 517 in uplink operation) requires modification, the gain is adjusted accordingly. The controller 540 may then issue an SIRS disable signal (or simply cease the SIRS enable signal) to the first and second SIRS switches 522, 524 so that the data carrying signal can be retransmitted as before using the updated gain value of the VGA 516 (or the VGA 517 in uplink operation).

It will be appreciated therefore that the one or more SIRSs may be transmitted at one or more times when data-carrying radio signals received by the radio repeater 500 are not being retransmitted.

In some example embodiments, the radio repeater 500 may retransmit data-carrying radio signals associated with a downlink during a first repeating period and data-carrying radio signals associated with an uplink during a second repeating period, the first and second repeating periods being separated by a guard period, wherein the controller 540 or a remote node controller may cause the one or more SIRSs to be transmitted in the guard period. The SIRSs need to be shorter than the guard period.

In some example embodiments, the one or more SIRSs may be transmitted according to a schedule which determines to transmit the one or more SIRSs at a time when one or more other repeater apparatus, e.g. within a predetermined range of the apparatus do not transmit signals.

For example, SIRSs may be transmitted or around 200 ms.

In some example embodiments, the one or more SIRSs may be transmitted using a frequency band that is different from frequency band(s) used by one or more other repeater apparatuses within a predetermined range of the apparatus.

In this respect, the one or more other repeater apparatuses within a predetermined range of the apparatus comprise one or more repeater nodes associated with a RAN cell with which the apparatus is associated, e.g. the same RAN cell.

It follows that, to avoid the power sensor 530 sensing, or measuring, SIRS receive power levels from other nearby repeaters, the SIRSs may need to be "orthogonalized" in terms of timing and/or frequency. Thus, a network of radio repeaters 500 may be scheduled accordingly so that SIRSs and other radio activity from one radio repeater does not interference with that of others in the network.

In some example embodiments, the one or more SIRSs may comprise an analogue tone, e.g. at a particular frequency. For example, the analogue tone SIRS may be transmitted using a different frequency from frequencies used by one or more repeater nodes within a predetermined range of the apparatus.

In some example embodiments, the one or more SIRSs may comprise a digitally-encoded data signal. The digitally-encoded data signal SIRSs may different from those used by one or more repeater nodes within a predetermined range of the apparatus.

The one or more SIRSs may comprise pilot or synchronisation signals (e.g. primary and/or secondary synchronisation signals) associated with the data-carrying radio signals. The timings of these types of reference signals may be provided to the apparatus by a base station or may be pre-provided at the apparatus, e.g. stored on one or more memories.

In some example embodiments, the controller 540 may store, or have access to, one or more sets of reference data which may indicate how to perform the fifth and sixth operations 4.5, 4.6 indicated in FIG. 4. In other words, the one or more sets of reference data may comprise values or rules for determining how to decrease and/or increase the gain of the VGA 516 for a determined self-interference power level. For example, the one or more sets of reference data may indicate the amount of gain reduction or increase to apply to the VGA 516.

The one or more sets of reference data may comprise one or more look-up-tables (LUTs).

The one or more sets of reference data may be pre-populated, for example during a characterization testing stage prior to deployment, and may be based on a predetermined SIRS transmit power level.

The LUT may be updated periodically or on demand as new values are obtained and measured and may act as a reference point for subsequent operations.

Figure 6:
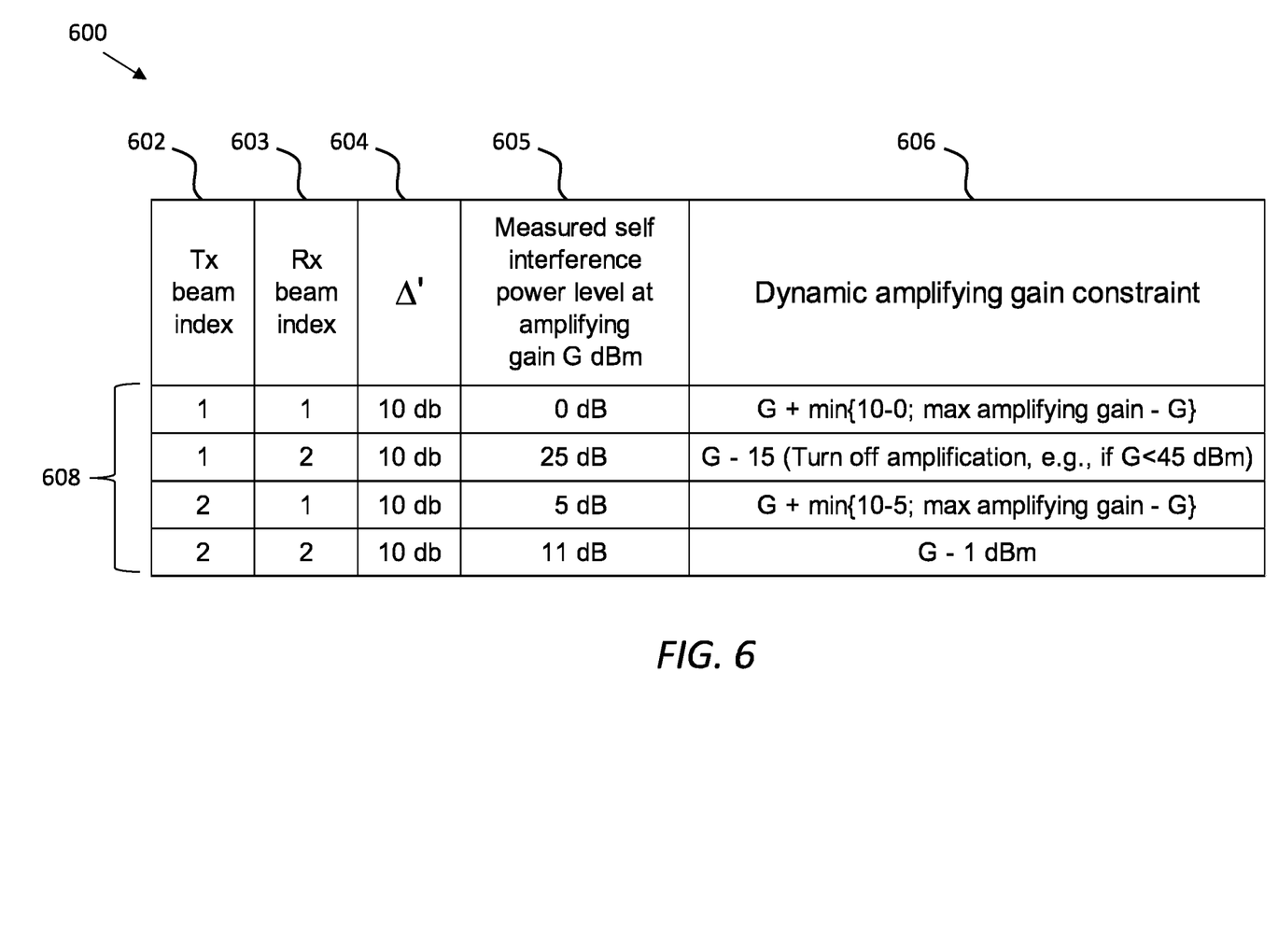
FIG. 6 is a tabular representation of a set of reference data in the form of a look-up table according to some example embodiments.

Referring to FIG. 6, an example set of reference data is shown in the form of a LUT 600.

The LUT 600 comprises reference data for a repeater apparatus configured the same or similar to the radio repeater of FIG. 5. It is assumed that the receive antenna 502 and the transmit antenna 504 comprise antenna arrays configured for beamforming using a 2×2 beam configuration. In practice, a larger number of beams may be provided for. The antenna arrays may therefore transmit and receive respective SIRSs using a plurality of beams at respective times, and hence the reference data in the LUT 600 may indicate values for the four different beam combinations. The transmit beams and the receive beams are referenced by respective index numbers as shown in first and second columns 602, 603 of the LUT 600.

The third column 604 may indicate the above mentioned predetermined threshold $\Delta'$ which is set, in this example, to 10 dB.

The fourth column 605 may indicate reference values corresponding to measured self-interference power values (or levels) at a predetermined gain G of the VGA 516 in dBm.

The fifth column 606 may indicate a set of dynamic gain constraints applied to the current gain G when decreasing or increasing the gain of the VGA 516 according to one or more predetermined rules.

The rows 608 represent the various beam index combinations.

For example, for the case where the transmit beam index was "1" and the receive beam index was "1" the measured self-interference power value was 0 dB and so below the 10 dB threshold. In accordance with the fourth operation 4.4 in FIG. 4, the process moved to the sixth operation 4.6 and the gain G of the VGA 516 could be increased. According to the LUT 600, the gain G could be increased by a value equal to:

$$G+\min(10-0; \text{maximum amplifying gain} - G).$$

For the case where the transmit beam index was "1" and the receive beam index was "2" the measured self-interference power value was 25 dB and so above the 10 dB threshold. In accordance with the fourth operation 4.4 in FIG. 4, the process moved to the fifth operation 4.5 and the gain G of the VGA 516 could be decreased. According to the LUT 600, the gain G could be decreased by a value equal to:

$$G-15 \text{ dBm (or turn off amplification, e.g. if } G<45 \text{ dBm)}.$$

For the case where the transmit beam index was "2" and the receive beam index was "1" the measured self-interference power value was 5 dB and so below the 10 dB threshold. In accordance with the fourth operation 4.4 in FIG. 4, the process moved to the sixth operation 4.6 and the gain G of the VGA 516 could be increased. According to the LUT 600, the gain G could be increased by a value equal to:

$$G+\min(10-5; \text{maximum amplifying gain} - G).$$

For the case where the transmit beam index was "2" and the receive beam index was "2" the measured self-interference power value was 11 dB and so above the 10 dB threshold. In accordance with the fourth operation 4.4 in FIG. 4, the process moved to the fifth operation 4.5 and the gain G of the VGA 516 could be decreased. According to the LUT 600, the gain G could be decreased by a value equal to:

$$G-1 \text{ dBm.}$$

In subsequent operations of the radio repeater 500, based on the transmit beam index and receive beam index at a particular time, and the determined self-interference power value, the controller may access the LUT 600 and determine how to increase or decrease the value of G.

As an alternative to using a LUT 600 or other reference data, the radio repeater 500 may transmit an SIRS for all the possible beams (i.e. sweeps all beam index combinations) and adjusts the gain according to the strongest self-interference power level observed. For example, the gain may be adjusted to be the minimum of all gain values given in the fifth column 606, which should correspond to the maximum self-interference power level indicated in the fourth column 605.

In some embodiments, there may be provided a method of signalling between a network node, e.g. network hub access point (AP), whereby the AP schedules radio resources based on how particular radio repeaters are reporting self-interference. For example, if a particular radio repeater, through operation according to examples mentioned above, update the LUT 600 to indicate a high-level of self-interference whereby the radio repeater needs to be turned off, at least for a particular beam index combination, the AP may avoid scheduling a particular UE through said radio repeater or for that beam index combination.

In example embodiments, the radio repeater 500 may be a radio access network (RAN) repeater. For example, the RAN repeater may be configured for full-duplex operation. For example, the RAN repeater may be configured for in-band operation.

Example embodiments provide an apparatus, method and computer program product that may offer advantages in terms of control of radio relays, for example those which are operating in the full-duplex and/or in-band modes where self-interference might otherwise be a technical issue causing performance degradation. Example embodiments, through use of SIRSs, enable dynamic operation on the basis of possibly changing self-interference effects over time which can be unpredictable. Example embodiments may achieve such advantages without the need for, for example, physical shielding.

Example embodiments may allow the isolation between antennas to be proportional to the amplifier gain of the radio repeater 500 in order to keep the interference power level low enough. The interfering signal may be the same as the useful signal with a short delay, the signal linearity degradation may be acceptably low if the interference power level is low, e.g. provided the amplifier gain is less than the transmit power level. However, with increased delay, as may be the case in IAB setups which use more complex processing, the required isolation may need to be higher to keep the signal degradation low. Hence, example embodiments employ the predetermined threshold and also may act in a dynamic manner through the use of SIRSs.

Example Apparatus

Figure 7:
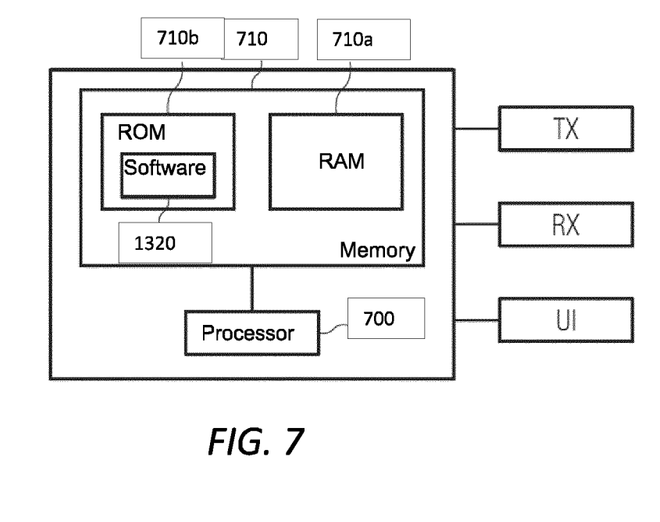
FIG. 7 is a schematic view of an apparatus that may be configured according to some example embodiments.

FIG. 7 shows an example apparatus that may comprise, for example, the controller 504 or one or more of the power sensor 530, gain controller 532 and the reference signal generator 534.

The apparatus may comprise at least one processor 700 and at least one memory 710 directly or closely connected or coupled to the processor. The memory 710 may comprise at least one random access memory (RAM) 710a and at least one read-only memory (ROM) 710b. Computer program code (software) 720 may be stored in the ROM 710b. The apparatus may be connected to a transmitter path and a receiver path in order to obtain respective signals or data. The apparatus may be connected with a user interface (UI) for instructing the apparatus and/or for outputting data. The at least one processor 700 with the at least one memory 710 and the computer program code 720 may be arranged to cause the apparatus to at least perform methods described herein, such as those described with reference to FIGS. 3 and/or 4.

The processor 700 may be a microprocessor, plural microprocessors, a microcontroller, or plural microcontrollers.

The memory may take any suitable form.

Figure 8:
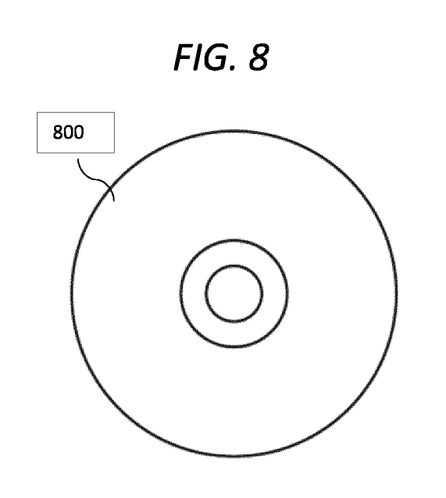
FIG. 8 is a non-transitory medium that may comprise code or data according to some example embodiments.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program code causing an apparatus to perform operations described above when executed by a processor such as processor 700 of FIG. 7.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus, comprising means for: transmitting one or more reference signals at a transmit power level using a transmit antenna of a repeater; measuring a receive power level of the corresponding one or more reference signals received using a receive antenna of the repeater, wherein one or both of the transmit and receive antennas comprise an antenna array for respectively transmitting and receiving respective reference signals using a plurality of beams; determining a self-interference power value based on the difference between the transmit power level of the one or more reference signals and the receive power level of the one or more corresponding reference signals; determining whether the self-interference power value is above or below a predetermined threshold; accessing one or more sets of reference data indicative of an amount of gain reduction or gain increase to apply to a gain associated with an amplifying means of the repeater, wherein the reference data is indicative of the amount of gain reduction or gain increase to apply for different combinations of transmit and receive antenna beams for a given self-interference power value; modifying, at a given time, the gain for a given beam combination based on the one or more sets of reference data and based on the determination of whether the self-interference power value is above or below the predetermined threshold, wherein if the self-interference power is below the predetermined threshold, the modifying means is configured to increase the gain, and wherein if the self-interference power value is above the predetermined threshold, the modifying means is configured to decrease the gain.

2. The apparatus of claim 1, wherein the predetermined threshold is based on the transmit power level minus a predetermined design value.

3. The apparatus of claim 1, wherein the modifying means is configured to reduce or increase the gain based on the difference between the self-interference power value and the predetermined threshold.

4. The apparatus of claim 3, wherein the modifying means is configured to reduce the gain by an amount substantially equal to the difference between the self-interference power value and the predetermined threshold.

5. The apparatus of claim 4, wherein the modifying means is configured to determine that the amount of gain reduction is greater than a further predetermined threshold and, responsive thereto, to disable at least the amplifying means.

6. The apparatus of claim 4, wherein the modifying means is configured to increase the gain by an amount substantially equal to the minimum of (i) the difference between the self-interference power value and the predetermined threshold and (ii) a maximum gain value associated with the amplifying means minus the current gain.

7. The apparatus of claim 1, wherein the one or more sets of reference data comprise a look-up-table pre-populated during characterization testing and prior to deployment of the apparatus.

8. The apparatus of claim 1, wherein the one or more reference signals are transmitted at one or more times when data-carrying radio signals received by the apparatus are not being retransmitted.

9. The apparatus of claim 8, wherein the apparatus is configured to retransmit data-carrying radio signals associated with an uplink during a first repeating period and data-carrying radio signals associated with a downlink during a second repeating period, the first and second repeating periods being separated by a guard period, wherein the one or more reference signals are transmitted in the guard period.

10. The apparatus of claim 1, wherein the one or more reference signals are transmitted according to a schedule which determines to transmit the one or more reference signals at a time when one or more repeater nodes within a predetermined range of the apparatus do not transmit signals.

11. A method comprising:
transmitting one or more reference signals at a transmit power level using a transmit antenna of a repeater;
measuring a receive power level of the corresponding one or more reference signals received using a receive antenna of the repeater;
determining a self-interference power value based on the difference between the transmit power level of the one or more reference signals and the receive power level of the one or more corresponding reference signals;
determining if the self-interference power value is above or below a predetermined threshold;
accessing one or more sets of reference data indicative of an amount of gain reduction or gain increase to apply to a gain associated with an amplifying means of the repeater, wherein the reference data is indicative of the amount of gain reduction or gain increase to apply for different combinations of transmit and receive antenna beams for a given self-interference power value;

modifying, at a given time, the gain for a given beam combination based on the one or more sets of reference data and based on the determination of whether the self-interference power value is above or below the predetermined threshold, wherein if the self-interference power value is below the predetermined threshold the modifying the gain comprises increasing the gain, and wherein if the self-interference power value is above the predetermined threshold, modifying the gain comprises decreasing the gain.

12. The method of claim 11, wherein the predetermined threshold is based on the transmit power level minus a predetermined design value.

13. The method of claim 11, wherein modifying includes reducing or increasing the gain based on the difference between the self-interference power value and the predetermined threshold.

14. The method of claim 13, wherein modifying includes reducing the gain by an amount substantially equal to the difference between the self-interference power value and the predetermined threshold.

15. The method of claim 13, wherein modifying includes increasing the gain by an amount substantially equal to the minimum of (i) the difference between the self-interference power value and the predetermined threshold and (ii) a maximum gain value associated with the amplifying means minus the current gain.

16. The method of claim 11, wherein modifying includes determining that the amount of gain reduction is greater than a further predetermined threshold and, responsive thereto, to disabling at least the amplifying means.

17. The method of claim 11, wherein the one or more sets of reference data comprise a look-up-table pre-populated during characterization testing and prior to deployment of the apparatus.

18. The method of claim 11, wherein the one or more reference signals are transmitted at one or more times when data-carrying radio signals received by the apparatus are not being retransmitted.

19. The method of claim 11, further comprising retransmitting data-carrying radio signals associated with an uplink during a first repeating period and data-carrying radio signals associated with a downlink during a second repeating period, the first and second repeating periods being separated by a guard period, wherein the one or more reference signals are transmitted in the guard period.

20. The method of claim 11, wherein the one or more reference signals are transmitted according to a schedule which determines to transmit the one or more reference signals at a time when one or more repeater nodes within a predetermined range of the apparatus do not transmit signals.

* * * * *